(12) United States Patent
Lim

(10) Patent No.: US 12,069,240 B2
(45) Date of Patent: Aug. 20, 2024

(54) VIDEO SIGNAL PROCESSING METHOD AND DEVICE

(71) Applicant: KT CORPORATION, Gyeonggi-do (KR)

(72) Inventor: Sung Won Lim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 75 days.

(21) Appl. No.: 17/636,987

(22) PCT Filed: Aug. 28, 2020

(86) PCT No.: PCT/KR2020/011549
§ 371 (c)(1),
(2) Date: Feb. 21, 2022

(87) PCT Pub. No.: WO2021/040459
PCT Pub. Date: Mar. 4, 2021

(65) Prior Publication Data
US 2022/0295045 A1    Sep. 15, 2022

(30) Foreign Application Priority Data

Aug. 30, 2019 (KR) .................. 10-2019-0107558
Aug. 30, 2019 (KR) .................. 10-2019-0107559

(51) Int. Cl.
*H04N 19/105* (2014.01)
*H04N 19/176* (2014.01)
(Continued)

(52) U.S. Cl.
CPC ......... *H04N 19/105* (2014.11); *H04N 19/176* (2014.11); *H04N 19/186* (2014.11); *H04N 19/46* (2014.11)

(58) Field of Classification Search
None
See application file for complete search history.

(56) References Cited

U.S. PATENT DOCUMENTS

2015/0189302 A1* 7/2015 Pu .................. H04N 19/14
                                                            375/240.24
2015/0189319 A1    7/2015 Pu et al.
(Continued)

FOREIGN PATENT DOCUMENTS

CN    107005717 A    8/2017
JP    2019-022129 A   2/2019
(Continued)

OTHER PUBLICATIONS

Benjamin Bross et al. ( "Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019, hereinafter Bross). (Year: 219).*
(Continued)

*Primary Examiner* — Samuel D Fereja
(74) *Attorney, Agent, or Firm* — IP Legal Services, LLC

(57) ABSTRACT

A video encoding/decoding method and device according to the present invention may comprise: configuring a palette table for a palette mode of a current block; determining per-pixel palette indices of the current block; and predicting pixels of the current block on the basis of the palette table and the palette indices.

9 Claims, 12 Drawing Sheets

(51) Int. Cl.
*H04N 19/186* (2014.01)
*H04N 19/46* (2014.01)

(56) References Cited

U.S. PATENT DOCUMENTS

| | | |
|---|---|---|
| 2016/0100179 A1 | 4/2016 | He et al. |
| 2016/0323591 A1 | 11/2016 | Chuang et al. |
| 2017/0026641 A1 | 1/2017 | Lai et al. |
| 2017/0244964 A1 | 8/2017 | Liu et al. |
| 2017/0272744 A1 | 9/2017 | Liu et al. |
| 2018/0027246 A1 | 1/2018 | Liu et al. |
| 2018/0091829 A1 | 3/2018 | Liu et al. |
| 2018/0098092 A1 | 4/2018 | Ye et al. |
| 2018/0098093 A1 | 4/2018 | Ye et al. |
| 2018/0295382 A1 | 10/2018 | Liu et al. |
| 2019/0028718 A1 | 1/2019 | Koyama |
| 2019/0089986 A1 | 3/2019 | Ye et al. |
| 2019/0116380 A1 | 4/2019 | Chuang et al. |
| 2019/0158854 A1 | 5/2019 | He et al. |
| 2020/0288170 A1 | 9/2020 | Chuang et al. |

FOREIGN PATENT DOCUMENTS

| | | |
|---|---|---|
| KR | 10-2016-0102071 A | 8/2016 |
| KR | 10-2017-0094544 A | 8/2017 |
| KR | 10-2019-0042761 A | 4/2019 |
| WO | 2016/127889 A1 | 8/2016 |

OTHER PUBLICATIONS

Benjamin Bross et al., "Versatile Video Coding (Draft 6)", Document: JVET-O2001-vE, Joint Video Experts Team (JVET) of ITU-T SG 16 WP 3 and ISO/IEC JTC 1/SC 29/WG 11, 15th Meeting: Gothenburg, SE, Jul. 3-12, 2019.

China National Intellectual Property Administration, Office Action of corresponding CN Patent Application No. 202080060676.3, Apr. 11, 2024.

* cited by examiner

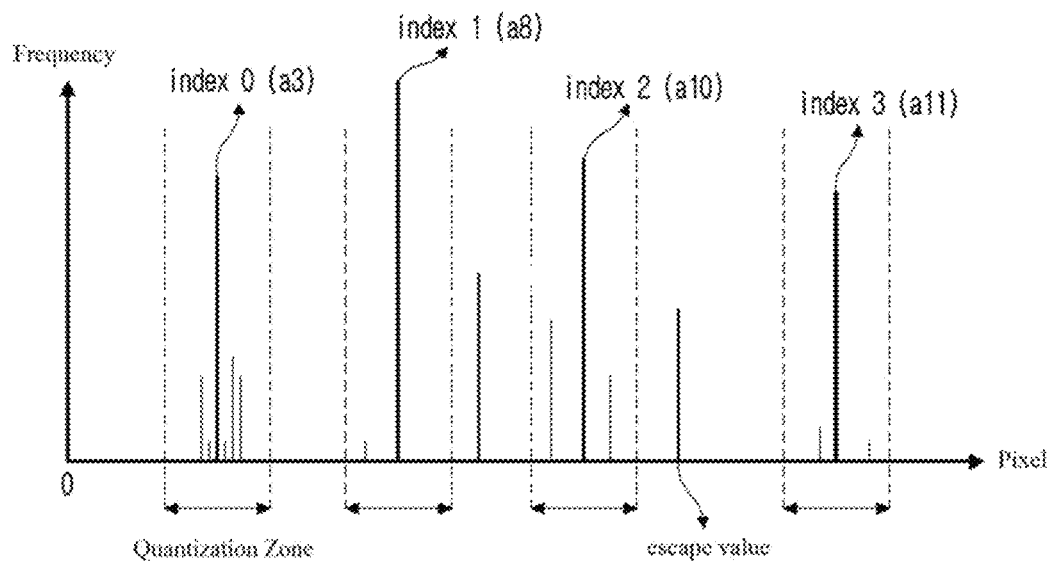

FIG. 13
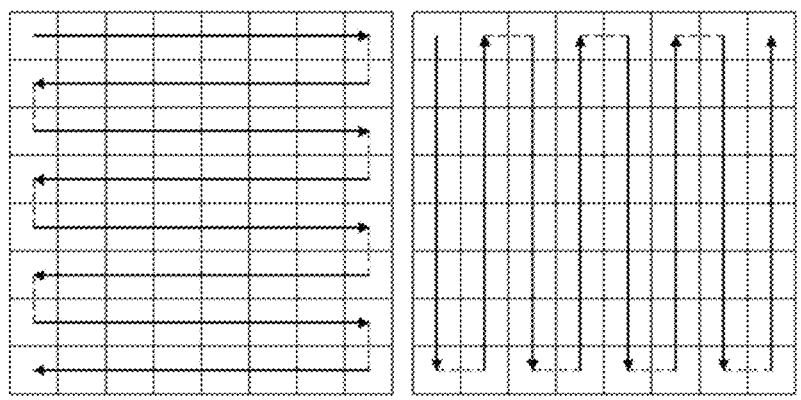
(a)
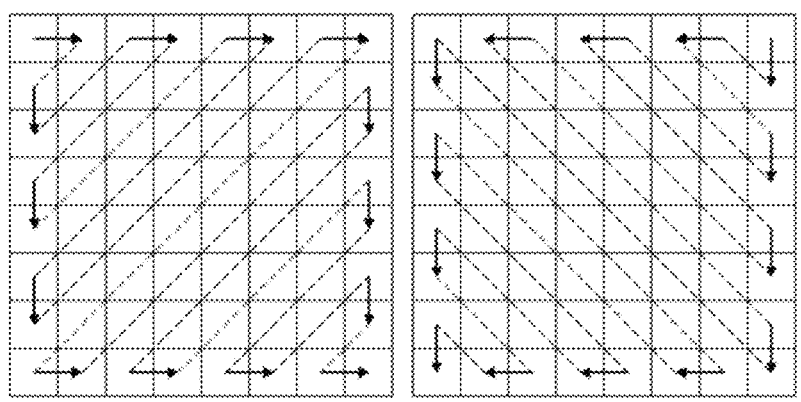
(b)

VIDEO SIGNAL PROCESSING METHOD AND DEVICE

CROSS REFERENCE TO RELATED APPLICATIONS

This application is a National Stage Patent Application of PCT International Patent Application No. PCT/KR2020/011549 (filed on Aug. 28, 2020) under 35 U.S.C. § 371, which claims priority to Korean Patent Application No. 10-2019-0107558 (filed on Aug. 30, 2019) and 10-2019-0107559 (filed on Aug. 30, 2019), the teachings of which are incorporated herein in their entireties by reference.

FIELD OF THE DISCLOSURE

The present disclosure relates to a method and a device for processing a video signal.

DESCRIPTION OF THE RELATED ART

Recently, demands for high-resolution and high-quality images such as HD (High Definition) images and UHD (Ultra High Definition) images have increased in a variety of application fields. As image data becomes high-resolution and high-quality, the volume of data relatively increases compared to the existing image data, so when image data is transmitted by using media such as the existing wire and wireless broadband circuit or is stored by using the existing storage medium, expenses for transmission and expenses for storage increase. High efficiency image compression technologies may be utilized to resolve these problems which are generated as image data becomes high-resolution and high-quality.

There are various technologies such as an inter prediction technology which predicts a pixel value included in a current picture from a previous or subsequent picture of a current picture with an image impression technology, an intra prediction technology which predicts a pixel value included in a current picture by using pixel information in a current picture, an entropy encoding technology which assigns a short sign to a value with high appearance frequency and assigns a long sign to a value with low appearance frequency and so on, and image data may be effectively compressed and transmitted or stored by using these image compression technologies.

On the other hand, as demands for a high-resolution image have increased, demands for stereo-scopic image contents have increased as a new image service. A video compression technology for effectively providing high-resolution and ultra high-resolution stereo-scopic image contents has been discussed.

DISCLOSURE

Technical Purpose

A purpose of the present disclosure is to provide an intra prediction method and device in encoding/decoding a video signal.

A purpose of the present disclosure is to provide an intra prediction method and device based on a palette mode in encoding/decoding a video signal.

Technical effects of the present disclosure may be non-limited by the above-mentioned technical effects, and other unmentioned technical effects may be clearly understood from the following description by those having ordinary skill in the technical field to which the present disclosure pertains.

Technical Solution

A video signal encoding/decoding method and device according to the present disclosure may configure a palette table for a palette mode of a current block, determine a palette index in a unit of a pixel of the current block and predict a pixel of the current block based on the palette table and the palette index.

In a video signal encoding/decoding method and device according to the present disclosure, the palette mode may be selectively used based on a first flag representing whether the palette mode is used.

In a video signal encoding/decoding method and device according to the present disclosure, a first flag representing whether the palette mode is used may be adaptively encoded/decoded based on at least one of a prediction mode of the current block or a size of the current block.

In a video signal encoding/decoding method and device according to the present disclosure, a palette table of the current block may be configured with at least one palette entry and an index identifying each palette entry and a palette entry of the palette table may be configured by using a second flag representing whether a palette table of a previous block decoded before a current block and a palette entry belonging to the previous palette table are reused.

In a video signal encoding/decoding method and device according to the present disclosure, the palette table may be initialized in a unit of a CTU row and when a CTU to which the current block belongs is a first CTU of a current CTU row, a palette table of a CTU to which the current block belongs may be initialized by using a palette table of a first CTU of a previous CTU row.

In a video signal encoding/decoding method and device according to the present disclosure, a palette index of the current block may be determined by using at least one of an index mode or a copy mode.

In a video signal encoding/decoding method and device according to the present disclosure, the index mode may be a mode which uses palette index information encoded/decoded to specify a palette index of the current block and the copy mode may be a mode which uses a palette index of a neighboring pixel according to a predetermined scan order.

In a computer readable recoding medium storing a bitstream encoded by a video encoding method according to the present disclosure, the video encoding method may include configuring a palette table for a palette mode of a current block, determining a palette index in a unit of a pixel of the current block and predicting a pixel of the current block based on the palette table and the palette index.

Technical Effect

According to the present disclosure, encoding/decoding efficiency of a palette mode may be improved by configuring a palette table of a current block based on a previous palette table.

According to the present disclosure, encoding/decoding efficiency of a palette mode may be improved by adaptively using a scan order of a palette mode.

According to the present disclosure, encoding/decoding efficiency of a palette index for each pixel of a current block may be improved.

Effects obtainable from the present disclosure may be non-limited by the above-mentioned effect, and other unmentioned effects may be clearly understood from the following description by those having ordinary skill in the technical field to which the present disclosure pertains.

BRIEF DESCRIPTION OF THE DRAWINGS

FIG. 3 to FIG. 5 are diagrams for describing a concept of a palette mode according to the present disclosure.

FIG. 13 to FIG. 18 show a method of encoding/decoding a palette index in a scan order according to the present disclosure.

BEST MODE

Figure 1:
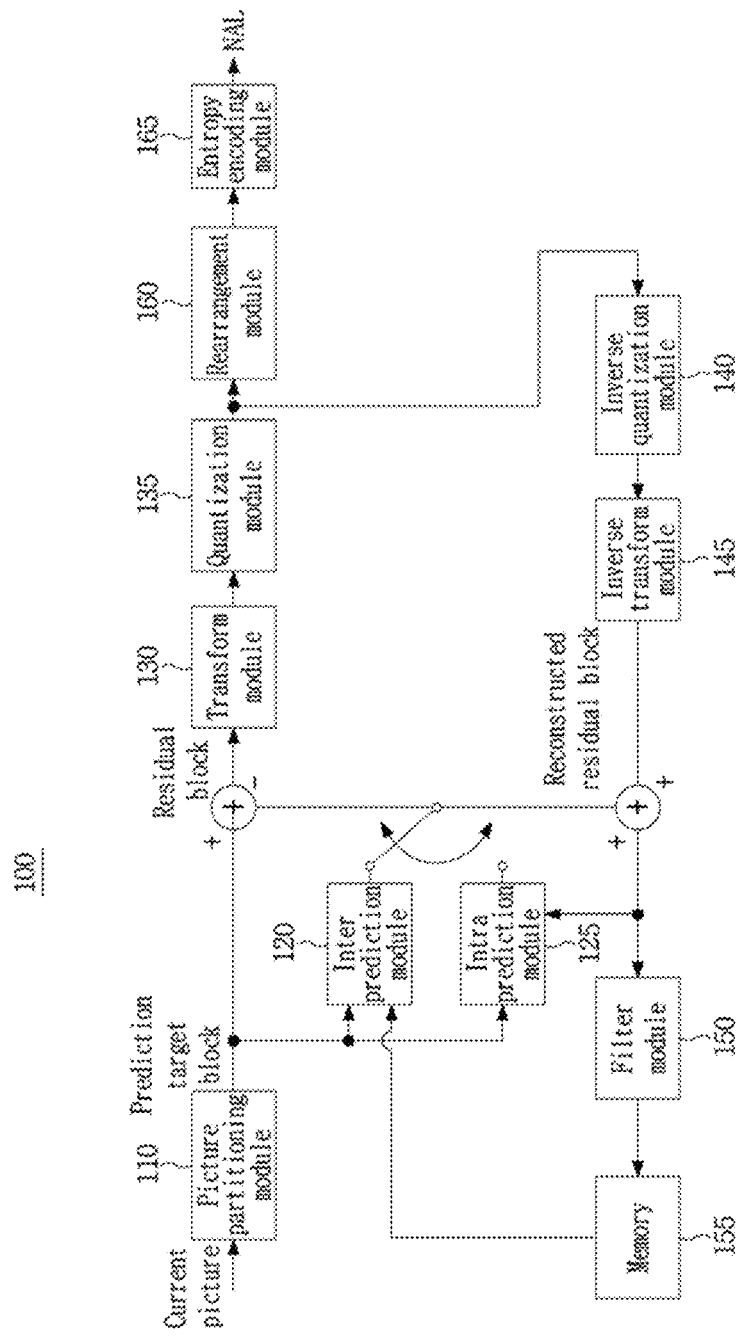
FIG. 1 is a block diagram showing an image encoding device according to an embodiment of the present disclosure.

A video signal encoding/decoding method and device according to the present disclosure may configure a palette table for a palette mode of a current block, determine a palette index in a unit of a pixel of the current block and predict a pixel of the current block based on the palette table and the palette index.

In a video signal encoding/decoding method and device according to the present disclosure, the palette mode may be selectively used based on a first flag representing whether the palette mode is used.

In a video signal encoding/decoding method and device according to the present disclosure, a first flag representing whether the palette mode is used may be adaptively encoded/decoded based on at least one of a prediction mode of the current block or a size of the current block.

In a video signal encoding/decoding method and device according to the present disclosure, a palette table of the current block may be configured with at least one palette entry and an index identifying each palette entry and a palette entry of the palette table may be configured by using a second flag representing whether a palette table of a previous block decoded before a current block and a palette entry belonging to the previous palette table are reused.

In a video signal encoding/decoding method and device according to the present disclosure, the palette table may be initialized in a unit of a CTU row and when a CTU to which the current block belongs is a first CTU of a current CTU row, a palette table of a CTU to which the current block belongs may be initialized by using a palette table of a first CTU of a previous CTU row.

In a video signal encoding method and device according to the present disclosure, a palette index of the current block may be determined by using at least one of an index mode or a copy mode.

In a video signal encoding/decoding method and device according to the present disclosure, the index mode may be a mode which uses palette index information encoded/decoded to specify a palette index of the current block and the copy mode may be a mode which uses a palette index of a neighboring pixel according to a predetermined scan order.

In a computer readable recoding medium storing a bitstream encoded by a video encoding method according to the present disclosure, the video encoding method may include configuring a palette table for a palette mode of a current block, determining a palette index in a unit of a pixel of the current block and predicting a pixel of the current block based on the palette table and the palette index.

DETAILED DESCRIPTION OF THE DISCLOSURE

As the present disclosure may make various changes and have several embodiments, specific embodiments will be illustrated in a drawing and described in detail. But, it is not intended to limit the present disclosure to a specific embodiment, and it should be understood that it includes all changes, equivalents or substitutes included in an idea and a technical scope for the present disclosure. A similar reference sign is used for a similar component while describing each drawing.

A term such as first, second, etc. may be used to describe various components, but the components should not be limited by the terms. The terms are used only to distinguish one component from other components. For example, without going beyond a scope of a right of the present disclosure, a first component may be referred to as a second component and similarly, a second component may be also referred to as a first component. A term, and/or, includes a combination of a plurality of relative entered items or any item of a plurality of relative entered items.

When a component is referred to as being "linked" or "connected" to other component, it should be understood that it may be directly linked or connected to other component, but other component may exist in the middle. On the other hand, when a component is referred to as being "directly linked" or "directly connected" to other component, it should be understood that other component does not exist in the middle.

As terms used in this application are only used to describe a specific embodiment, they are not intended to limit the present disclosure. Expression of the singular includes expression of the plural unless it clearly has a different meaning contextually. In this application, it should be understood that a term such as "include" or "have", etc. is to designate the existence of characteristics, numbers, stages, motions, components, parts or their combinations entered in a specification, but is not to exclude the existence or possibility of addition of one or more other characteristics, numbers, stages, motions, components, parts or their combinations in advance.

Hereinafter, referring to the attached drawings, a desirable embodiment of the present disclosure will be described in more detail. Hereinafter, the same reference sign is used for the same component in a drawing and an overlapping description for the same component is omitted.

FIG. 1 is a block diagram showing an image encoding device according to an embodiment of the present disclosure.

Referring to FIG. 1, an image encoding device 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

As each construction unit in FIG. 1 is independently shown to show different characteristic functions in an image encoding device, it does not mean that each construction unit is constituted by separated hardware or one software unit. That is, as each construction unit is included by being enumerated as each construction unit for convenience of a description, at least two construction units of each construction unit may be combined to constitute one construction unit or one construction unit may be partitioned into a plurality of construction units to perform a function, and even an integrated embodiment and a separated embodiment of each construction unit are also included in a scope of a right of the present disclosure unless they are departing from essence of the present disclosure.

Further, some components may be just an optional component for improving performance, not a necessary component which perform an essential function in the present disclosure. The present disclosure may be implemented by including only a construction unit necessary for implementing essence of the present disclosure excluding a component used to just improve performance, and a structure including only a necessary component excluding an optional component used to just improve performance is also included in a scope of a right of the present disclosure.

A picture partitioning unit 110 may partition an input picture into at least one processing unit. In this connection, a processing unit may be a prediction unit (PU), a transform unit (TU), or a coding unit (CU). In a picture partitioning unit 110, one picture may be partitioned into a combination of a plurality of coding units, prediction units and transform units and a picture may be encoded by selecting a combination of one coding unit, prediction unit and transform unit according to a predetermined standard (for example, cost function).

For example, one picture may be partitioned into a plurality of coding units. In order to partition a coding unit in a picture, a recursive tree structure such as a quad tree structure may be used, and a coding unit which is partitioned into other coding units by using one image or the largest coding unit as a route may be partitioned with as many child nodes as the number of partitioned coding units. A coding unit which is no longer partitioned according to a certain restriction becomes a leaf node. In other words, when it is assumed that only square partitioning is possible for one coding unit, one coding unit may be partitioned into up to four other coding units.

Hereinafter, in an embodiment of the present disclosure, a coding unit may be used as a unit for encoding or may be used as a unit for decoding.

A prediction unit may be partitioned with at least one square or rectangular shape, etc. in the same size in one coding unit or may be partitioned so that any one prediction unit of prediction units partitioned in one coding unit can have a shape and/or size different from another prediction unit.

In generating a prediction unit performing intra prediction based on a coding block, when it is not the smallest coding unit, intra prediction may be performed without performing partitioning into a plurality of prediction units, N×N.

Prediction units 120 and 125 may include an inter prediction unit 120 performing inter prediction and an intra prediction unit 125 performing intra prediction. Whether to perform inter prediction or intra prediction for a prediction unit may be determined and detailed information according to each prediction method (for example, an intra prediction mode, a motion vector, a reference picture, etc.) may be determined. In this connection, a processing unit that prediction is performed may be different from a processing unit that a prediction method and details are determined. For example, a prediction method, a prediction mode, etc. may be determined in a prediction unit and prediction may be performed in a transform unit. A residual value (a residual block) between a generated prediction block and an original block may be input to a transform unit 130. In addition, prediction mode information used for prediction, motion vector information, etc. may be encoded with a residual value in an entropy encoding unit 165 and may be transmitted to a decoding device. When a specific encoding mode is used, an original block may be encoded as it is and transmitted to a decoding unit without generating a prediction block through prediction units 120 or 125.

An inter prediction unit 120 may predict a prediction unit based on information on at least one picture of a previous picture or a subsequent picture of a current picture, or in some cases, may predict a prediction unit based on information on some encoded regions in a current picture. An inter prediction unit 120 may include a reference picture interpolation unit, a motion prediction unit and a motion compensation unit.

A reference picture interpolation unit may receive reference picture information from a memory 155 and generate pixel information equal to or less than an integer pixel in a reference picture. For a luma pixel, an 8-tap DCT-based interpolation filter having a different filter coefficient may be used to generate pixel information equal to or less than an integer pixel in a ¼ pixel unit. For a chroma signal, a 4-tap DCT-based interpolation filter having a different filter coefficient may be used to generate pixel information equal to or less than an integer pixel in a ⅛ pixel unit.

A motion prediction unit may perform motion prediction based on a reference picture interpolated by a reference picture interpolation unit. As a method for calculating a motion vector, various methods such as FBMA (Full search-based Block Matching Algorithm), TSS (Three Step Search), NTS (New Three-Step Search Algorithm), etc. may be used. A motion vector may have a motion vector value in a unit of a ½ or ¼ pixel based on an interpolated pixel. A motion prediction unit may predict a current prediction unit by varying a motion prediction method. As A motion prediction method, various methods such as a skip method, a merge method, an advanced motion vector prediction (AMVP) method, an intra block copy method, etc. may be used.

An intra prediction unit 125 may generate a prediction unit based on reference pixel information around a current block, which is pixel information in a current picture. When a neighboring block in a current prediction unit is a block which performed inter prediction and thus, a reference pixel is a pixel which performed inter prediction, a reference pixel included in a block which performed inter prediction may be used by being replaced with reference pixel information of a surrounding block which performed intra prediction. In other words, when a reference pixel is unavailable, unavailable reference pixel information may be used by being replaced with at least one reference pixel of available reference pixels.

A prediction mode in intra prediction may have a directional prediction mode using reference pixel information according to a prediction direction and a non-directional mode not using directional information when performing prediction. A mode for predicting luma information may be different from a mode for predicting chroma information and intra prediction mode information used for predicting luma information or predicted luma signal information may be utilized to predict chroma information.

When a size of a prediction unit is the same as that of a transform unit in performing intra prediction, intra prediction for a prediction unit may be performed based on a pixel at a left position of a prediction unit, a pixel at a top-left position and a pixel at a top position. However, when a size of a prediction unit is different from that of a transform unit in performing intra prediction, intra prediction may be performed by using a reference pixel based on a transform unit. In addition, intra prediction using N×N partitioning may be used only for the smallest coding unit.

In addition, an intra prediction unit 125 may perform intra prediction based on a palette mode and it will be described in detail by referring to FIG. 3 to FIG. 18.

In an intra prediction method, a prediction block may be generated after applying an adaptive intra smoothing (AIS) filter to a reference pixel according to a prediction mode. A type of an AIS filter applied to a reference pixel may be different. In order to perform an intra prediction method, an intra prediction mode in a current prediction unit may be predicted from an intra prediction mode in a prediction unit around a current prediction unit. When a prediction mode in a current prediction unit is predicted by using mode information predicted from a surrounding prediction unit, information that a prediction mode in a current prediction unit is the same as a prediction mode in a surrounding prediction unit may be transmitted by using predetermined flag information if an intra prediction mode in a current prediction unit is the same as an intra prediction mode in a surrounding prediction unit and prediction mode information of a current block may be encoded by performing entropy encoding if a prediction mode in a current prediction unit is different from a prediction mode in a surrounding prediction unit.

In addition, a residual block may be generated which includes information on a residual value that is a difference value between a prediction unit which performed prediction based on a prediction unit generated in prediction units 120 and 125 and an original block in a prediction unit. A generated residual block may be input to a transform unit 130.

A transform unit 130 may transform an original block and a residual block which includes residual value information in a prediction unit generated through prediction units 120 and 125 by using a transform method such as DCT (Discrete Cosine Transform), DST (Discrete Sine Transform), KLT. Whether to apply DCT, DST or KLT to transform a residual block may be determined based on an intra prediction mode information in a prediction unit which is used to generate a residual block.

A quantization unit 135 may quantize values transformed into a frequency domain in a transform unit 130. A quantization coefficient may be changed according to a block or importance of an image. A value calculated in a quantization unit 135 may be provided to a dequantization unit 140 and a rearrangement unit 160.

A rearrangement unit 160 may perform rearrangement on coefficient values for a quantized residual value.

A rearrangement unit 160 may change a coefficient in a shape of a two-dimensional block into a shape of a one-dimensional vector through a coefficient scan method. For example, a rearrangement unit 160 may scan from a DC coefficient to a coefficient in a high frequency domain by using a zig-zag scan method and change it into a shape of a one-dimensional vector. According to a size of a transform unit and an intra prediction mode, instead of a zig-zag scan, a vertical scan where a coefficient in a shape of a two-dimensional block is scanned in a column direction or a horizontal scan where a coefficient in a shape of a two-dimensional block is scanned in a row direction may be used. In other words, which scan method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. Entropy encoding may use various encoding methods such as exponential Golomb, CAVLC (Context-Adaptive Variable Length Coding), CABAC (Context-Adaptive Binary Arithmetic Coding).

An entropy encoding unit 165 may encode a variety of information such as residual value coefficient information in a coding unit and block type information, prediction mode information, partitioning unit information, prediction unit information and transmission unit information, motion vector information, reference frame information, block interpolation information, filtering information, etc. from a rearrangement unit 160 and prediction units 120 and 125.

An entropy encoding unit 165 may perform entropy encoding for a coefficient value in a coding unit which is input from a rearrangement unit 160.

A dequantization unit 140 and an inverse transform unit 145 perform dequantization for values quantized in a quantization unit 135 and perform inverse transform on values transformed in a transform unit 130. A residual value generated by a dequantization unit 140 and an inverse transform unit 145 may be combined with a prediction unit predicted by a motion prediction unit, a motion compensation unit and an intra prediction unit included in prediction units 120 and 125 to generate a reconstructed block.

A filter unit 150 may include at least one of a deblocking filter, an offset correction unit and an adaptive loop filter (ALF).

A deblocking filter may remove block distortion which is generated by a boundary between blocks in a reconstructed picture. In order to determine whether deblocking is performed, whether a deblocking filter is applied to a current block may be determined based on a pixel included in several rows or columns included in a block. When a deblocking filter is applied to a block, a strong filter or a weak filter may be applied according to required deblocking filtering strength. In addition, in applying a deblocking filter, when horizontal filtering and vertical filtering are performed, horizontal directional filtering and vertical directional filtering may be set to be processed in parallel.

An offset correction unit may correct an offset with an original image in a unit of a pixel for an image that deblocking was performed. In order to perform offset correction for a specific picture, a region where an offset will be performed may be determined after dividing a pixel included in an image into the certain number of regions and a method in which an offset is applied to a corresponding region or a method in which an offset is applied by considering edge information of each pixel may be used.

Adaptive loop filtering (ALF) may be performed based on a value obtained by comparing a filtered reconstructed image with an original image. After a pixel included in an image is divided into predetermined groups, filtering may be discriminately performed per group by determining one filter which will be applied to a corresponding group. Information related to whether ALF will be applied may be transmitted per coding unit (CU) for a luma signal and a shape and a filter coefficient of an ALF filter to be applied may vary according to each block. In addition, an ALF filter in the same shape (fixed shape) may be applied regardless of a feature of a block to be applied.

A memory 155 may store a reconstructed block or picture calculated through a filter unit 150 and a stored reconstructed block or picture may be provided to prediction units 120 and 125 when performing inter prediction.

Figure 2:
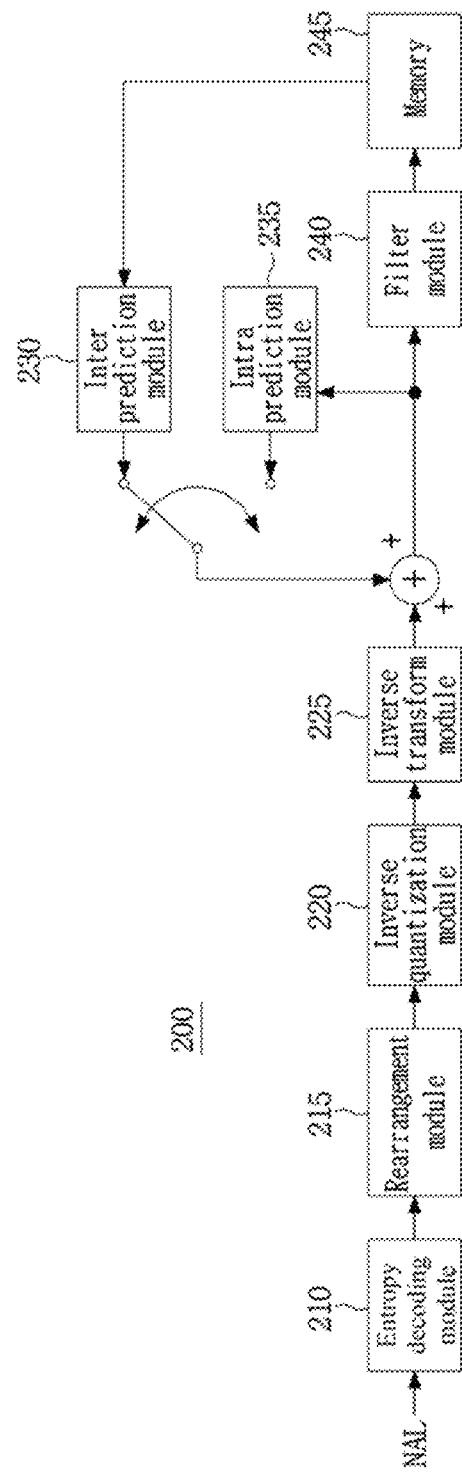
FIG. 2 is a block diagram showing an image decoding device according to an embodiment of the present disclosure.

FIG. 2 is a block diagram showing an image decoding device according to an embodiment of the present disclosure.

Referring to FIG. 2, an image decoding device 200 may include an entropy decoding unit 210, a rearrangement unit 215, a dequantization unit 220, an inverse transform unit 225, prediction units 230 and 235, a filter unit 240, and a memory 245.

When an image bitstream is input from an image encoding device, an input bitstream may be decoded according to a procedure opposite to an image encoding device.

An entropy decoding unit 210 may perform entropy decoding according to a procedure opposite to a procedure in which entropy encoding is performed in an entropy encoding unit of an image encoding device. For example, in response to a method performed in an image encoding device, various methods such as Exponential Golomb, CAVLC (Context-Adaptive Variable Length Coding), CABAC (Context-Adaptive Binary Arithmetic Coding) may be applied.

An entropy decoding unit 210 may decode information related to intra prediction and inter prediction performed in an encoding device.

A rearrangement unit 215 may perform rearrangement based on a method that a bitstream entropy-decoded in an entropy decoding unit 210 is rearranged in an encoding unit. Coefficients represented in a form of a one-dimensional vector may be rearranged by being reconstructed into coefficients in a form of a two-dimensional block. A rearrangement unit 215 may receive information related to a coefficient scan performed in an encoding unit and perform rearrangement through a method in which a scan is inversely performed based on a scan order performed in a corresponding encoding unit.

A dequantization unit 220 may perform dequantization based on a quantization parameter provided from an encoding device and a coefficient value of a rearranged block.

An inverse transform unit 225 may perform transform performed in a transform unit, i.e., inverse transform for DCT, DST, and KLT, i.e., inverse DCT, inverse DST and inverse KLT for a result of quantization performed in an image encoding device. Inverse transform may be performed based on a transmission unit determined in an image encoding device. In an inverse transform unit 225 of an image decoding device, a transform technique (for example, DCT, DST, KLT) may be selectively performed according to a plurality of information such as a prediction method, a size of a current block, a prediction direction, etc.

Prediction units 230 and 235 may generate a prediction block based on information related to generation of a prediction block provided from an entropy decoding unit 210 and pre-decoded block or picture information provided from a memory 245.

As described above, when a size of a prediction unit is the same as a size of a transform unit in performing intra prediction in the same manner as an operation in an image encoding device, intra prediction for a prediction unit may be performed based on a pixel at a left position of a prediction unit, a pixel at a top-left position and a pixel at a top position, but when a size of a prediction unit is different from a size of a transform unit in performing intra prediction, intra prediction may be performed by using a reference pixel based on a transform unit. In addition, intra prediction using N×N partitioning may be used only for the smallest coding unit.

Prediction units 230 and 235 may include a prediction unit determination unit, an inter prediction unit and an intra prediction unit. A prediction unit determination unit may receive a variety of information such as prediction unit information, prediction mode information of an intra prediction method, motion prediction-related information of an inter prediction method, etc. which are input from an entropy decoding unit 210, divide a prediction unit in a current coding unit and determine whether a prediction unit performs inter prediction or intra prediction. An inter prediction unit 230 may perform inter prediction for a current prediction unit based on information included in at least one picture of a previous picture or a subsequent picture of a current picture including a current prediction unit by using information necessary for inter prediction in a current prediction unit provided from an image encoding device. Alternatively, inter prediction may be performed based on information on some regions which are pre-reconstructed in a current picture including a current prediction unit.

In order to perform inter prediction, whether a motion prediction method in a prediction unit included in a corresponding coding unit is a skip mode, a merge mode, an AMVP mode, or an intra block copy mode may be determined based on a coding unit.

An intra prediction unit 235 may generate a prediction block based on pixel information in a current picture. When a prediction unit is a prediction unit which performed intra prediction, intra prediction may be performed based on intra prediction mode information in a prediction unit provided from an image encoding device. In addition, an intra prediction unit 235 may perform intra prediction based on a palette mode and it will be described in detail by referring to FIG. 3 to FIG. 18. An intra prediction unit 235 may include an adaptive intra smoothing (AIS) filter, a reference pixel interpolation unit and a DC filter. As a part performing filtering on a reference pixel of a current block, an MS filter may be applied by determining whether a filter is applied according to a prediction mode in a current prediction unit. AIS filtering may be performed for a reference pixel of a current block by using AIS filter information and a prediction mode in a prediction unit provided from an image encoding device. When a prediction mode of a current block is a mode which does not perform AIS filtering, an AIS filter may not be applied.

When a prediction mode in a prediction unit is a prediction unit which performs intra prediction based on a pixel value which interpolated a reference pixel, a reference pixel interpolation unit may interpolate a reference pixel to generate a reference pixel in a unit of a pixel equal to or less than an integer value. When a prediction mode in a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset correction unit and ALF.

Information on whether a deblocking filter was applied to a corresponding block or picture and information on whether a strong filter or a weak filter was applied when a deblocking filter was applied may be provided from an image encoding device. Information related to a deblocking filter provided from an image encoding device may be provided in a deblocking filter of an image decoding device and deblocking filtering for a corresponding block may be performed in an image decoding device.

An offset correction unit may perform offset correction on a reconstructed image based on offset value information, a type of offset correction applied to an image when performing encoding.

ALF may be applied to a coding unit based on information on whether ALF is applied, ALF coefficient information, etc. provided from an encoding device. Such ALF information may be provided by being included in a specific parameter set.

A memory 245 may store a reconstructed picture or block for use as a reference picture or a reference block and provide a reconstructed picture to an output unit.

As described above, hereinafter, in an embodiment of the present disclosure, a coding unit is used as a term of a coding unit for convenience of a description, but it may be a unit which performs decoding as well as encoding.

In addition, as a current block represents a block to be encoded/decoded, it may represent a coding tree block (or a coding tree unit), a coding block (or a coding unit), a transform block (or a transform unit) or a prediction block (or a prediction unit), etc. according to an encoding/decoding step. In this specification, 'a unit' may represent a base unit for performing a specific encoding/decoding process and 'a block' may represent a pixel array in a predetermined size. Unless otherwise classified, 'a block' and 'a unit' may be used interchangeably. For example, in the after-described embodiment, it may be understood that a coding block (a coding block) and a coding unit (a coding unit) are used interchangeably.

Figure 5:
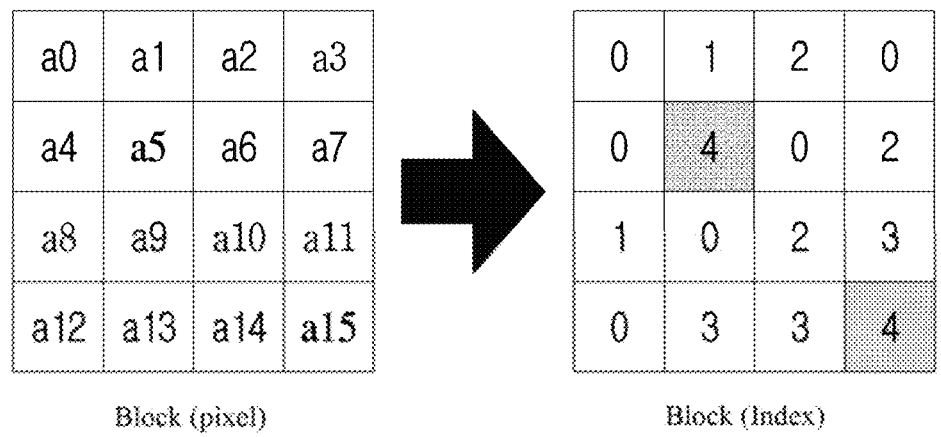

FIG. 3 to FIG. 5 are diagrams for describing a concept of a palette mode according to the present disclosure.

A palette mode is a method that after indicating a pixel occurring frequently in a block to be encoded (hereinafter, referred to as a current block) as a specific index, that specific index instead of a pixel is encoded and transmitted to a decoding device. A flag representing whether a palette mode is allowed may be encoded and transmitted to a decoding device. In this case, the flag may be encoded only when a size of a current block is equal to or less than a pre-set size. A pre-set size may be determined based on a slice type of a slice to which a current block belongs or an encoding mode or a prediction mode of a current block. In an example, when a current block belongs to slice I, a palette mode may be used only when a size of a current block is 4×4. When a current block belongs to slice B or P, a palette mode may be used only when a size of a current block is larger than 4×4 and smaller than 64×64.

FIG. 3 illustrates a process in which a palette table is generated. For convenience of a description, it is described on the assumption that a size of a current block is 4×4. First, a histogram for 16 pixels in a current block is as in FIG. 3. In FIG. 3, a horizontal axis means a pixel value (e.g., for a pixel quantized by 8 bits, one value from 0 to 225) and a vertical axis means frequency of a pixel value. Subsequently, a quantization zone is set based on pixels with high frequency. Pixels in a quantization zone are replaced with a pixel with the highest frequency and one index is assigned to a pixel with the highest frequency. Information representing a size of a quantization zone may be encoded and transmitted to a decoding device. Alternatively, a size of a quantization zone may be determined based on at least one of a size, a shape or a bit depth of a current block.

In FIG. 3, in each quantization zone, a3, a8, a10 and a11 mean a pixel with the highest frequency, respectively and the rest means other pixels. And, a pixel which is not included in a quantization zone is expressed as an escape value and this value is additionally quantized and encoded besides being encoded by an index.

FIG. 4 shows an example on a palette table set in FIG. 3.

In FIG. 4, each row of a palette table is expressed as a palette entry and a different index is assigned to each entry. In other words, a size of a palette table may mean the number of entries.

An entry is configured by using pixels with the highest frequency in each quantization zone (a3, a8, a10, a11) and an index is assigned to each entry. If an escape value exists, an escape may be arranged to a last entry and an index may be assigned thereto. In other words, a last index in a palette may mean an escape value.

FIG. 5 is an example on a process in which pixels in a block are assigned to an index by using a set palette table. In FIG. 5, assigned indexes are expressed as a palette index.

Pixels which existed in a block are replaced with an index according to a palette table and an index is encoded and transmitted to a decoding device. And, when it is indicated as an escape value (a5 and a15 in FIG. 5), a5' and a15' which are additionally quantized and encoded besides an index. In addition, a palette table, that is used, is also encoded and transmitted to a decoding device.

Figure 6:
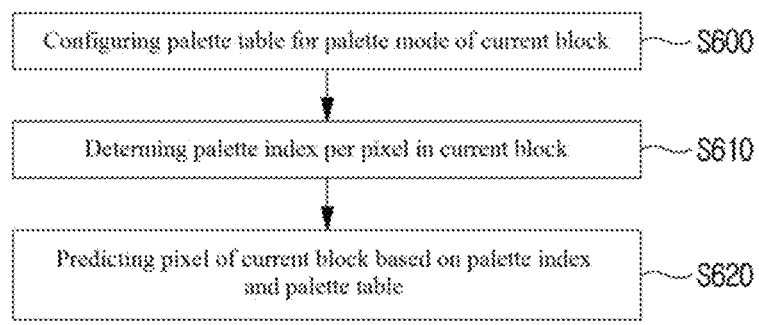
FIG. 6 shows a method of performing intra prediction based on a palette mode according to the present disclosure.

FIG. 6 shows a method of performing intra prediction based on a palette mode according to the present disclosure.

A palette mode may be applied in a unit of a block (e.g., a coding unit, a prediction unit) and for it, flag information (pred_mode_plt_flag) representing whether a palette mode is used in a unit of a block may be signaled. In other words, when a value of the flag is 1, a palette mode is applied to a current block and when a value of the flag is 0, a palette mode is not applied to a current block.

The flag may be adaptively encoded/decoded based on at least one of a prediction mode of a current block or a size of a current block. For example, the flag may be encoded/decoded only when a prediction mode of a current block is an intra mode. The flag may be encoded/decoded only when a prediction mode of a current block is not a skip mode. The flag may be encoded/decoded only when at least one of a width or a height of a current block is smaller than or equal to a predetermined first threshold size. Here, as a first threshold size is a value which is pre-defined in an encoding/decoding device, it may be any one of 16, 32, or 64. The flag may be encoded/decoded only when a multiplication of a width and a height of a current block is greater than a predetermined second threshold size. Here, as a second threshold size is a value which is pre-defined in an encoding/decoding device, it may be any one of 16, 32, or 64. But, the first threshold size may be different from the second threshold size. When any one of the above-described conditions is not satisfied, the flag is not encoded/decoded and in this case, a value of the flag may be set as 0.

In reference to FIG. 6, a palette table for a palette mode of a current block may be configured S600.

A palette table may be configured with at least one palette entry and a palette index identifying each palette entry. A palette table of a current block may be determined by using a palette table of a previous block (hereinafter, referred to as a previous palette table). Here, a previous block may mean a block which is encoded or decoded before a current block.

Concretely, a palette entry of a current block may include at least one of a predicted palette entry or a signaled palette entry. A current block may use all or part of palette entries used by a previous block and as such, a palette entry which is reused in a current block among palette entries used in a previous block is referred to as a predicted palette entry.

A current block may use all palette entries of a previous palette table. Alternatively, a current block may use part of palette entries of a previous palette table and for it, a flag (PalettePredictorEntryReuseFlag, hereinafter, referred to as a palette prediction flag) specifying whether a palette entry is reused may be used. A value of the palette prediction flag is assigned to each palette entry of a previous palette table and the palette prediction flag (PalettePredictorEntryReuseFlag[i]) may represent whether a palette entry corresponding to palette index i in a previous palette table is reused for a palette table of a current block. For example, when a value of the palette prediction flag is 1, a palette entry corresponding to palette index i in a previous palette table is reused for a palette table of a current block and when a value of the palette prediction flag is 0, it is not reused. A palette table of a current block may be configured by extracting a palette entry that a value of a palette prediction flag is 1 from a previous palette table and sequentially arranging it.

On the other hand, a palette table of a current block may be initialized in a unit of a predetermined region. Here, a predetermined region may mean a parallel processing region or a CTU row of a current picture. If a current block belongs to a first CTU of a CTU row, a palette table of a current block may be initialized to a palette table of a neighboring CTU of a CTU to which a current block belongs. Here, a neighboring CTU may mean a CTU at a top position of a CTU to which a current block belongs. In other words, a palette table for a first CTU of a N-th CTU row may be initialized based on a palette table for a first CTU of a (N−1)-th CTU row. An initialized palette table may be updated based on a palette table of a previous block belonging to the same CTU row. The above-described embodiment is just an example and a method of configuring a palette table of a current block will be described in detail by referring to FIG. 7 to FIG. 11.

On the other hand, the palette prediction flag may be signaled in a form of an encoded/decoded flag per palette entry. Alternatively, the palette prediction flag may be encoded/decoded in a form of a run length encoding-based binary vector. In other words, palette predictor run, a syntax specifying the number of zero palette prediction flags between non-zero palette prediction flags, may be encoded/decoded in a palette prediction flag array specifying whether a previous palette entry is reused. It will be described in detail by referring to FIG. 12.

In addition, a palette table of a current block may additionally include a palette entry signaled in a bitstream and here, the signaled palette entry may mean a palette entry which is not included in a previous palette table among palette entries used by a current block. A signaled palette entry may be added after a predicted palette entry of a palette table.

In reference to FIG. 6, a palette index may be determined in a unit of a pixel of a current block S610.

A current block may determine a palette index by using at least one of an index mode or a copy mode.

Here, an index mode may mean a method that palette index information (palette_idx_idc) is encoded in an encoding device to specify a palette index used in a current block. A decoding device may derive a palette index of a current pixel based on encoded palette index information. Palette index information has a value between 0 and (MaxPaletteIndex−1) and here, MaxPaletteIndex may mean a size of a palette table of a current block or the number of palette entries configuring a palette table. In an index mode, a value of palette index information signaled in a bitstream may be assigned to a palette index of a current pixel.

A copy mode may mean a method that a palette index of a current pixel is determined by using a palette index of a neighboring pixel in a predetermined scan order. Here, as a scan order according to the present disclosure, a horizontal directional scan, a vertical directional scan, a diagonal directional scan, etc. may be used and any one of them may be selectively used. For it, a predetermined flag or index may be encoded/decoded. For example, an encoding device may encode the flag as 0 when a horizontal directional scan is applied as a scan order of a current block and may encode the flag as 1 when a vertical directional scan is applied as a scan order of a current block. A decoding device may adaptively determine a scan order of a current block according to an encoded flag. But, it is not limited thereto and a method of encoding/decoding a palette index in a scan order will be described in detail by referring to FIG. 13 to FIG. 18.

In a copy mode, a palette index of a current pixel may be predicted based on a palette index of a neighboring pixel and a palette index of a neighboring pixel may be copied and set as a palette index of a current pixel as it is. Here, a neighboring pixel may mean a pixel adjacent to the top, bottom, left or right of a current pixel. In particular, the neighboring pixel may be positioned on the same horizontal line or the same vertical line as a current pixel.

For example, the copy mode may include at least one of a first copy mode that a palette index used by a pixel adjacent to the top or bottom of a current pixel is used in the same manner as a palette index of a current pixel, a second copy mode that a palette index used by a pixel adjacent to the left or right of a current pixel is used in the same manner as a palette index of a current pixel and a third copy mode that a palette index used by a pixel adjacent in a diagonal direction of a current pixel is used in the same manner as a palette index of a current pixel.

On the other hand, any one of the above-described first to third copy mode may be selectively used in a scan order of a current block. For example, the first copy mode may be applied when a scan order of a current block is a vertical directional scan and the second copy mode may be applied when a scan order of a current block is a horizontal directional scan.

In addition, a scan start position of a current block is not limited to a top-left pixel of a current block and other corner pixel of a current block (e.g., a bottom-left pixel, a top-right pixel, a bottom-right pixel) may be used as a scan start position. Accordingly, according to a scan order and a scan start position of a current block, the same palette index as a pixel adjacent to the top or the left may be used or the same palette index as a pixel adjacent to the bottom or the right may be used as described above.

Any one of the above-described index mode and copy mode may be selectively used. For example, an encoding device may encode a flag (run_copy_flag) representing whether a copy mode is used. Here, if a copy mode is used, an encoding device may encode the flag as 1 and otherwise (i.e., when an index mode is used), an encoding device may encode the flag as 0.

In reference to FIG. 6, a pixel of a current block may be predicted based on the palette table and palette index S620.

Concretely, a palette entry having a palette index with the same value as the palette index may be extracted from a palette table of a current block and with it, a pixel of a current block may be predicted/reconstructed. For example, a value of a palette entry extracted from a palette table may be set as a prediction value or a reconstruction value of a pixel of a current block.

But, when the palette index indicates a last palette entry of palette entries in a palette table of a current block, it may be inferred that a corresponding pixel is encoded by an escape mode. Here, an escape mode may mean a method that a pixel is predicted/reconstructed based on a palette escape value which is additionally signaled instead of using a palette entry of a pre-configured palette table. Accordingly, a pixel having a palette index with the same value as (the number of palette entries−1) may be predicted/reconstructed by using the additionally signaled palette escape value.

The above-described embodiment is just an example and a variety of methods of configuring a palette table will be described in detail by referring to FIG. 7 to FIG. 11.

FIG. 7 to FIG. 11 show a method of configuring a palette table according to the present disclosure.

When a current block is encoded by a palette mode, the same palette table used in an encoding device should exist also in a decoding device. Accordingly, a palette table should be encoded in an encoding device. Accordingly, the number of palette entries in a palette table may be encoded and a value of a pixel assigned to each entry may be encoded. But, for such a method, as a size of a block gets larger and as the number of entries gets increased, the amount of bits to be encoded rapidly increases. Accordingly, if a palette mode was used in a previous block, the amount of bits necessary to encode a palette table may be greatly reduced by generating a palette table of a current block based on a palette table used in a previous block.

Here, a previous block means a block which was encoded/decoded before a current block. Concretely, at least one of a flag representing whether a palette table of a current block is configured based on a previous palette table or a palette prediction flag representing whether an entry included in a palette table of a previous block will be added to a palette table of a current block may be used.

Figure 7:
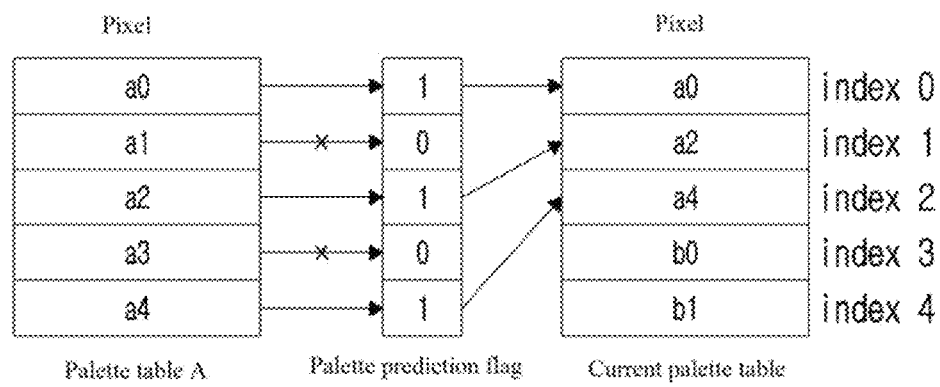
FIG. 7 to FIG. 11 show a method of configuring a palette table according to the present disclosure.

FIG. 7 is a method that the amount of bits in a palette table to be currently encoded is reduced by using a palette prediction flag.

In FIG. 7, palette table A may mean a palette table which exists in a block encoded by using a palette mode before a current block. In palette table A, whether each entry is used as it is for a current palette table by using a palette prediction flag may be specified. For example, if a palette prediction flag is 1, it may mean that a corresponding entry is used as it is for a current palette table and if a palette prediction flag is 0, it may mean that a corresponding entry is not used for a current palette table. An index assigned to entries predicted from palette table A may be set the same as an index assigned to palette table A. Alternatively, an index of each entries may be reassigned in ascending/descending order of indexes which were assigned to each entry in palette table A.

In an example of FIG. 7, a first entry, a third entry and a fifth entry are used in a current palette table, so they may put into a first entry to a third entry in a current palette table in order and only a fourth entry to a fifth entry may be configured as a new entry. Such a method may encode a palette prediction flag first and encode the number of remaining entries (for an example of FIG. 7, 2: a fourth entry and a fifth entry in a current palette table). Subsequently, as many remaining entries as the number of remaining entries may be encoded. By transmitting the information to a decoding device, a decoding device may also generate the same palette table as an encoding device and predict/reconstruct a current block.

Figure 8:
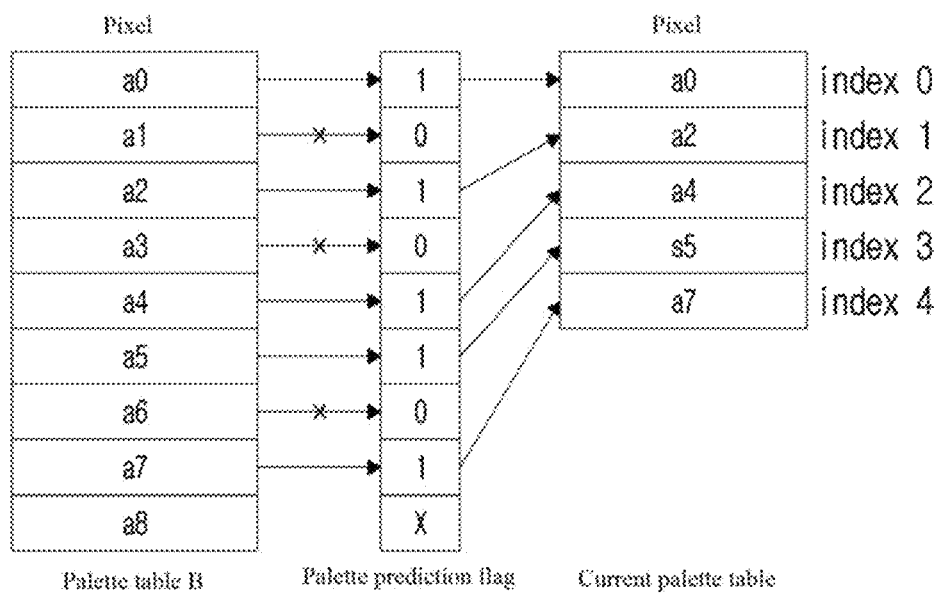

In this case, a size of a current palette table (the number of entries) may be different from a size of a previous palette table. FIG. 8 is an example on a case in which a size of a previous palette table is greater than a size of a current palette table. In this case, a size of a current palette table may be encoded first. In an example, at least one of information representing the number of entries included in a current palette table or information representing a difference value with a size of a previous palette table may be encoded in a bitstream and transmitted to a decoding device.

When a palette prediction flag is sequentially encoded for each entry included in a previous table, but the number of palette prediction flags having a value of 1 reaches a size of a current palette table, encoding of a palette prediction flag may be omitted for a remaining entry. In FIG. 8, for a last entry of palette table B (a pixel: a8), a palette prediction flag corresponding to it may not be encoded.

Alternatively, the number of entries which may be brought by using a palette prediction flag (hereinafter, referred to as the maximum number of predictions) may be limited. In an example, information on the maximum number of predictions may be signaled in a bitstream. Alternatively, the maximum number of predictions may be determined based on at least one of a size of a palette table, a size/a shape of a current block or a size of a previous palette table.

In an example, a method may be performed that an entry is brought from a previous palette table by using a palette prediction flag at a certain ratio of a size of a current palette table and the remaining ratio is forced be generated in a current palette table. For example, when a size of a current palette table is 6 and a ratio is set as 50%, up to 3 entries may be brought from a previous palette table by using a palette prediction flag and remaining 3 entries may be forced be generated in a current palette table. Accordingly, when an entry that a value of a palette prediction flag is 1 reaches 3, encoding of a palette prediction flag may be omitted for a remaining entry.

Alternatively, entries which will be included in a current palette table may be predicted from a plurality of previous palette tables. In an example, a method is also possible that when an entry is brought to a current palette table by using a prediction flag for each of entries included in a first previous palette table, but the number of palette prediction flags having a value of 1 is smaller than a size of a current palette table, a palette prediction flag is consecutively assigned by using a second previous palette table further before a first previous palette table.

Figure 9:
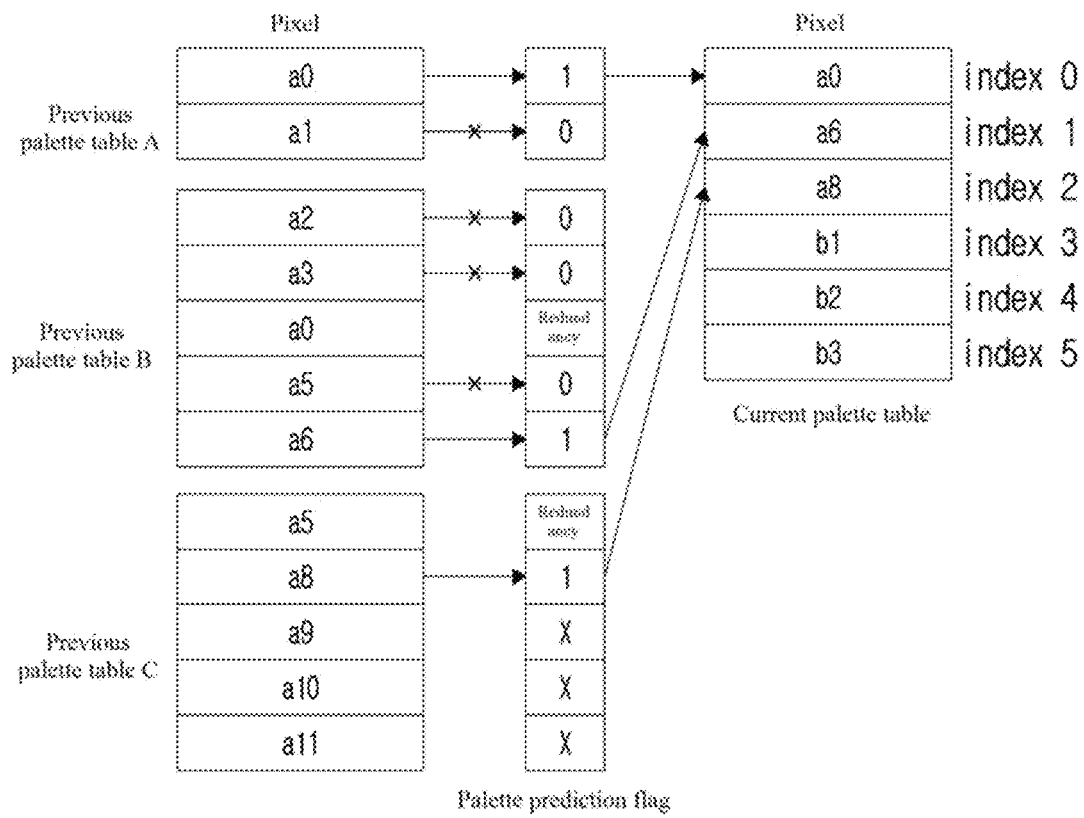

FIG. 9 is an example on a case in which a size of a previous palette table is smaller than a size of a current palette table, and at the same time, a case in which a ratio of an entry generated by using a palette prediction flag is set as 50%.

Because a size of a current palette table is 6, the number of entries generated by using a palette prediction flag is 3. Accordingly, a palette prediction flag is assigned by using previous palette tables until there are 3 palette prediction flags having 1. In FIG. 9, previous palette table A to C are an example in which palette tables in blocks encoded by a palette mode are brought in an encoding order of blocks before a current block. In this case, when bringing an entry from previous palette tables, an redundant entry does not assign a palette prediction flag. In FIG. 9, a0 in previous palette table B is indicated as a palette prediction flag in previous palette table A, so a palette prediction flag is not additionally assigned in previous palette table B. And, a5 in previous palette table C is already indicated as a palette prediction flag in previous palette table B, so a palette prediction flag is not additionally assigned in previous palette table C.

In addition, the number of referenced previous palette tables may be used as a fixed value by an encoding device and a decoding device or may be transmitted through a higher header.

Alternatively, whether reference may be possible when generating a current palette table may be determined by considering a size of a previous palette table. In an example, only when a size of a previous palette table is equal to or greater than a threshold value, or when a size of a previous palette table is the same as a size of a current palette table, reference may be determined to be available when generating a current palette table.

Alternatively, an encoding order of a palette prediction flag may be determined by considering an index of entries included in a first previous palette table and entries included in a second previous palette table. In an example, after encoding a palette prediction flag for an entry with an index of 0 included in a first previous palette table, a palette prediction flag for an entry with an index of 0 included in a second previous palette table may be encoded. Subsequently, after encoding a palette prediction flag for an entry with an index of 1 included in a first previous palette table, a palette prediction flag for an entry with an index of 1 included in a second previous palette table may be encoded.

Figure 10:
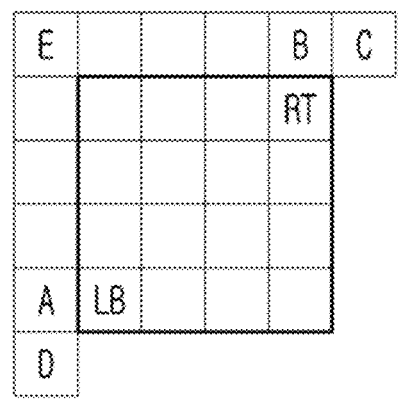

Alternatively, a palette table candidate list may be configured and at least one of a plurality of previous palette table candidates included in the palette table candidate list may be used when encoding a current palette table. FIG. 10 is a method that the amount of bits in a palette table to be currently encoded is reduced by using a palette prediction flag. In FIG. 10, RT means a pixel at a top-right position in a block and LB means a pixel at a bottom-left position in a block. For example, in FIG. 10, at least one of 5 surrounding blocks, i.e., blocks including pixel A to E respectively, may be referenced. Subsequently, a referenced block may be indicated as an index, encoded and transmitted to a decoding device. Alternatively, only a block at a pre-defined position in an encoding/decoding device among blocks including the above-described pixel A to E respectively may be referenced. Here, a pre-defined position may be a top block (B) or a left block (A). In this case, encoding of an index specifying a referenced block may be omitted.

A palette table for a current block may be initialized/configured by using only a palette entry of a block corresponding to the index.

Alternatively, if a palette table of a current block is not filled to exceed a threshold value by using only a palette table of a referenced block, a block may be additionally designated based on an additional index to fill a palette table to be currently encoded in a manner similar to a method in FIG. 9. In this case, an encoding/decoding device may refer to the pre-promised fixed number of blocks and information specifying the number of referenced blocks may be transmitted through a higher header. Alternatively, a method is also possible that an encoding/decoding device refers to the fixed number of surrounding blocks in the same manner according to a size/a shape of a block or a size of a palette table. Alternatively, a method is also possible that M blocks which are encoded by a palette mode before a current block in an encoding order besides a position in FIG. 10 are designated as an index to bring a palette table from a corresponding block. Alternatively, a method is also possible that a block included in a collocated picture is designated as an index to bring a palette table from a corresponding block.

Alternatively, a method of referring to a palette table pre-used in a block specified by a BV by using a BV (block vector) is also possible.

Figure 11:
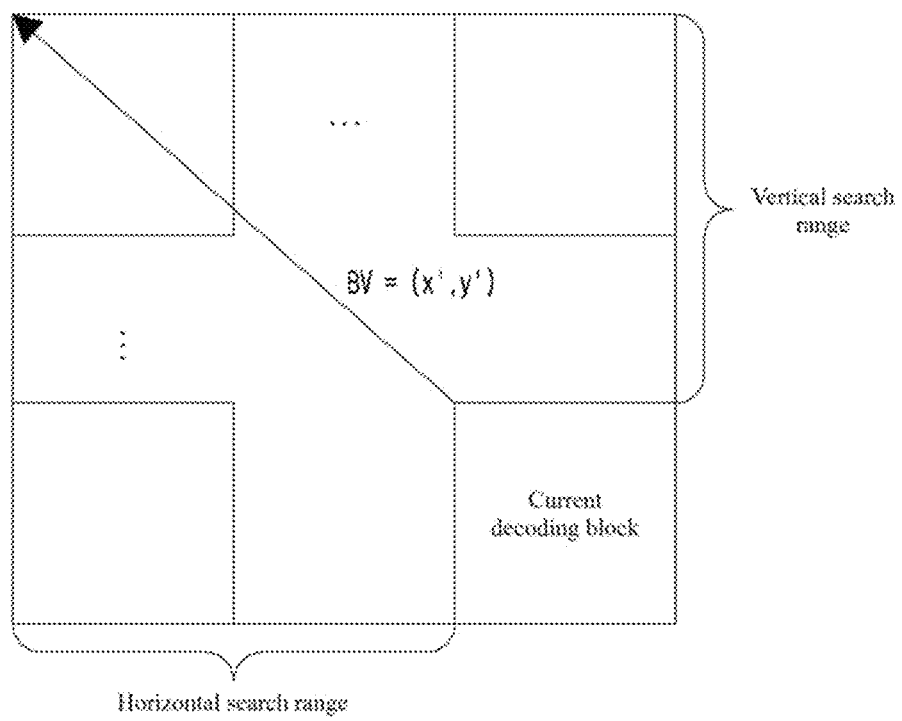

FIG. 11 is an example on a method of setting a BV. After setting a horizontal search range and a vertical search range in a reconstructed region around a current block, a region which is most similar to a current block is searched within a set search range. Subsequently, a region determined to be most similar is determined and if there is a region encoded by a palette mode in a corresponding region, a palette entry may be obtained from a corresponding palette table in a manner similar to that in FIG. 9. The number of palette tables used in this case may be 1 or may be multiple.

A determined BV is encoded and transmitted to a decoding device. Subsequently, after finding a region which is most similar to a current block by using the same BV in a decoding device, it may be brought by using a palette table of a corresponding region to set a palette table in the same manner as an encoding device.

Alternatively, a BV may be encoded based on a BV of a neighboring block. For example, if an encoding method using a BV was used around a current block, a corresponding BV may be used by merging with a current block. In this case, a position referring to a BV may include at least one of blocks shown in FIG. 10 or a collocated block included in a collocated picture. A position to refer to a BV is set in a manner similar to that in FIG. 10, which position was referenced is indicated as an index and it is encoded and transmitted to a decoding device. Alternatively, a priority may be determined according to a position without being indicated as an index. For example, a method is also possible that after determining a priority in an order of A->B->C->D->E in FIG. 10, a BV is brought from a position where a BV is determined to exist first and is used for a current block.

Alternatively, a BV of a neighboring block may be set as a prediction value of a BV and an index identifying the neighboring block and a difference value between a BV and a prediction value may be encoded and transmitted to a decoding device.

Alternatively, a method of configuring a palette table candidate list is also possible. Starting from a block at a first position of an image to just before a current block, all used palette tables are stored in a candidate list. Alternatively, after setting N, the number of tables which will be stored in a candidate list, N palette tables are stored in a candidate list. In other words, if encoding of a block is completed, a palette table of an encoded block may be stored in a candidate list. In this case, when there is the same palette table candidate as a palette table to be added to a candidate list, the palette table may not be added to the candidate list. Alternatively, the palette table may be added to the candidate list and the same palette table candidate as the palette table may be deleted from the candidate list.

In this case, a method in which palette table candidates in a candidate list are stored may have a higher priority as it is closer to a current block and may have a lower priority as it is farther from a current block. Alternatively, a priority may be set according to a size of a palette table or reference frequency, etc. According to this priority, when the number of stored tables exceeds N, with a palette table which has a lowest priority may be deleted from a candidate list.

Alternatively, in a parallel processing structure, a method is also possible that a palette table list is separately configured per each region which is processed in parallel. Alternatively, a method is also possible that a palette table list is separately configured per CTU row of a region. In this case, when each region where each parallel processing is performed separately has a palette table list, there may be very few palette tables stored in a palette table list at a beginning part of a region. Accordingly, a pre-set initial palette table may be also filled without filling a palette table from the beginning per region where each parallel processing is performed. For example, as seen in FIG. 6, an initial palette table may be a palette table of a first CTU of a previous CTU row. Alternatively, a pre-set initial palette table may be a palette table derived from a whole image, not a palette table derived in a unit of a block as in FIG. 3. In this case, values of each entry of a palette table derived from a whole image may be encoded by a higher header with the number of entries. Alternatively, when an initial palette table is configured, a value quantized according to a representation bit of a pixel may be also set as an entry value. For example, when an 8-bit pixel was quantized into 5 (5 entries), 0~255 may be divided into 5 regions and may be set as an entry and encoded by using a representative value of each region. Alternatively, if 0~255 were uniformly quantized, only information that they were uniformly quantized and information representing how many they were quantized may be encoded through a higher header.

Alternatively, a method is also possible that a palette entry candidate list is configured with entries included by a palette table. Entries included in a palette table of an encoded block may be added to an entry candidate list. In this case, among entries included in a palette table, only entries whose index is smaller than a threshold value may be included in an entry candidate list. When the number of entries included in a palette table of a current block is smaller than the maximum number, a palette table may be configured by referring to candidate entries included in a palette entry candidate list.

For a palette prediction flag, a run length encoding method may be used. When the same data is consecutive, it is referred to as run and that consecutive length is expressed as run length. For example, when there is a string, aaaaaabbcccccc, a is 6, B is 2 and c is 7, so it may be expressed as 6a2b7c. Such an encoding method is referred to as a run length encoding method. When palette prediction flags are encoded by using run length encoding, they may be expressed as the number of 0, the number of 1, etc. Alternatively, run length encoding may be performed only for 0 and conversely, run length encoding may be also performed only for 1.

Figure 12:
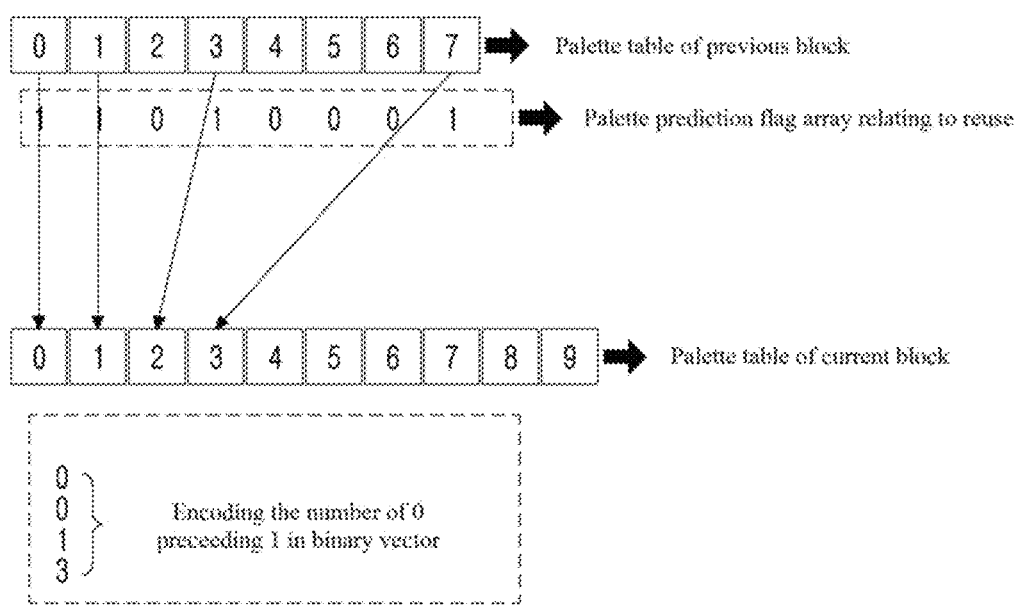
FIG. 12 shows a method of signaling a palette prediction flag in a form of a run length encoding-based binary vector as an embodiment to which the present disclosure is applied.

FIG. 12 shows a method of signaling a palette prediction flag in a form of a run length encoding-based binary vector as an embodiment to which the present disclosure is applied.

In the present embodiment, it is assumed that a palette table of a previous block used 8 palette entries having a palette index of 0 to 7.

An image encoding device determines whether a corresponding palette entry is reused as a palette entry of a current block for each of No. 0 to No. 7 palette entries of a previous block and if a corresponding palette entry is reused as a palette entry of a current block, a value of a palette prediction flag for a corresponding palette entry may be set as 1 and otherwise, it may be set as 0, respectively. For example, as shown in FIG. 12, when No. 0, 1, 3 and 7 palette entries among palette entries of a previous block are reused as a palette entry of a current block and other palette entries are not reused, a binary vector expressed as 11010001 may be generated.

Next, at least one of the number of 1 in the binary vector (i.e., the number of palette entries reused as a palette entry of a current block among palette entries of a previous block) or the number of 0 preceding 1 in the binary vector may be encoded and signaled by an image decoding device. For example, the number of 1 in the binary vector is 4, so 4 may be encoded as the number of palette entries of a previous block reused as a palette entry of a current block. In addition, the number of 0 preceding 1 in the binary vector, i.e., 0, 0, 1, 3 may be sequentially encoded.

A decoding device may receive at least one of information on the number of palette entries of a previous block reused as a palette entry of a current block or information (palette_entry_run) on the number of 0 preceding 1 in the binary vector from an encoding device and configure a palette table of a current block by using it.

For example, a decoding device may sequentially extract information (palette_entry_run) on the number of 0 preceding 1 in a binary vector, i.e., 0, 0, 1, 3 from a bitstream and use it to reconstruct a binary vector representing whether a palette entry of a previous block is reused, i.e., 11010001. When a value of 1 is generated in a process of reconstructing a binary vector, a palette entry of a previous block corresponding to a value of 1 may be inserted to a palette table of a current block. In such a process, some palette entries may be selectively reused from a palette table of a previous block to configure a palette table of a current block.

FIG. 13 to FIG. 18 show a method of encoding/decoding a palette index in a scan order according to the present disclosure.

After encoding a palette table, a palette index assigned to each pixel of a current block should be also encoded. FIG. 13 is an example on a scan order performed in a current block.

A main purpose of a scan order shown in FIG. 13 is to scan by considering directivity. If features of a pixel in a current block have a similar value in a horizontal direction or in a vertical direction as in FIG. 13(a), it increases a possibility that the same indexes will gather when a scan is performed as in FIG. 13(a). Alternatively, if features of a pixel in a block have a similar value in a z direction or in a diagonal direction as in FIG. 13(b), it increases a possibility that the same indexes will gather when a scan is performed as in FIG. 13(b).

In an encoding device, which scan method was used may be indicated as an index, encoded and transmitted to a decoding device. Alternatively, a scan order may be determined according to a size or a shape of a current block. After gathering indexes with the same value in such a scan method, encoding efficiency may be improved by performing run length encoding.

Alternatively, a fixed scan method is used, but run length encoding may be performed after rotating a current block. An encoding device may encode information representing whether a current block is rotated and transmit it to a decoding device. Alternatively, whether a current block is rotated may be determined according to a size or a shape of a current block.

And, information representing whether an escape value exists per block may be encoded. If an escape value exists, an index at any fixed position such as a last index or a first index, etc. may be used to indicate that a pixel at a corresponding position is an escape value. In this case, a method is also possible that a size of a derived palette table is used as it is as in FIG. 3, but an index is assigned by increasing a size of a palette table by 1 only when an escape value exists. Alternatively, a method is also possible that information representing whether each pixel in a block is an escape value is indicated and an index of a palette table is used only when it is not an escape value. When an escape value is encoded, both a loss encoding method and a lossless encoding method may be used. Information on whether lossless encoding is performed or not is added, and if when an escape value is encoded, if the information on whether lossless encoding is performed or not indicates that loss encoding is performed, an escape value is quantized, encoded and transmitted to a decoding device. In this case, information representing a degree that an escape value will be quantized (e.g., a quantization parameter) may be additionally encoded and a quantized escape value may be also encoded. If the information indicates that lossless encoding is performed, an escape value may be encoded without quantization and transmitted to a decoding device.

Figure 14:
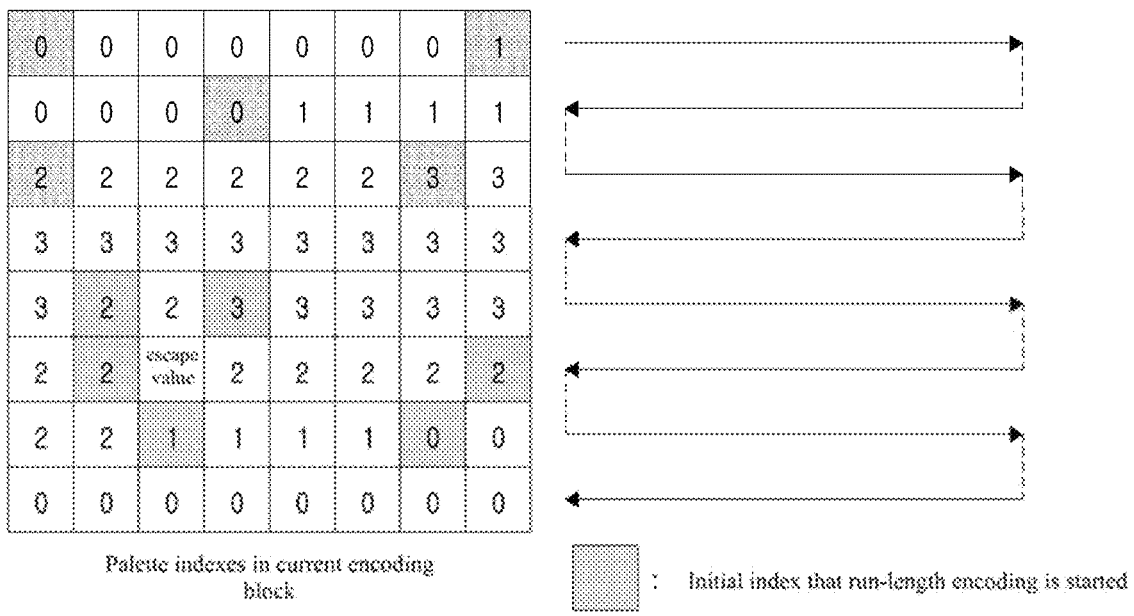

FIG. 14 is an example on a case in which a palette index in a current block is encoded. In this case, for convenience of a description, it is described on the assumption that a horizontal directional scan is applied. Information which should be encoded and transmitted to a decoding device needs initial indexes that run length encoding starts and run length following an initial index. In FIG. 14, an initial index is 0, 1, 0, 2, 3, 2, 3, 2, 2, 1, 0 in order except for an escape value. And, run length according to each initial index is 6, 4, 3, 5, 10, 1, 4, 4, 3, 3, 9 except for a start index. An escape value may be encoded by using an initial index and run length like other indexes. Alternatively, encoding may be performed by using information representing whether each corresponding pixel position is an escape value. For example, only when it is determined that it is not an escape value, encoding may be performed by using an initial index and run length and when it is determined that it is an escape value, an escape value may be immediately encoded without using an initial index and run length.

Figure 15:
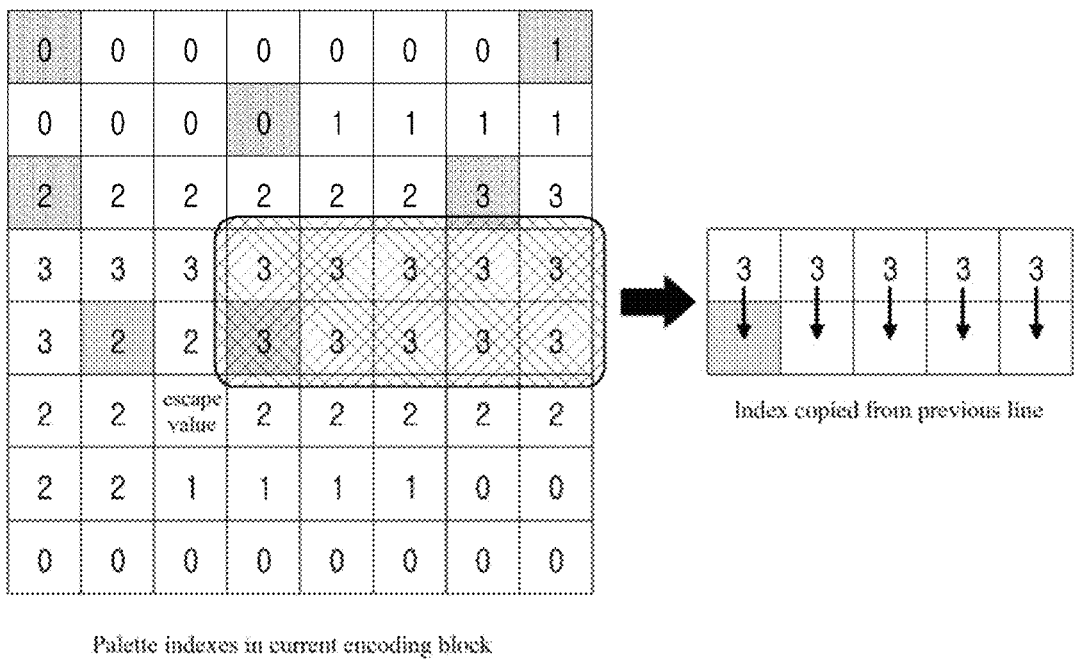

Alternatively, indexes may be copied from previous lines. FIG. 15 is an example on a case in which indexes are copied from previous lines.

When initial index 3 is encoded, the same indexes exist right above. In this case, before an initial index is encoded, information representing whether conventional run length encoding was used or whether it was copied from a pixel included in a previous line may be encoded first. A pixel included in a previous line may be positioned at a top row, a bottom row, a left column, a right column or a top-left corner according to a scan order. Subsequently, when it is determined to be copied from a previous line by the information, only run length including an initial index may be encoded without encoding an initial index.

For example, if a conventional method was used, information that it was not copied from a previous line and initial index 3 may be encoded and run length 4 may be encoded. If a method of copying from a previous line was applied, only information that it was copied from a previous line and run length 5 may be encoded.

In this case, information representing whether it was copied from a previous line may be indexed and indicated as what may be copied from multiple lines. For example, if the index is 0, a conventional run length encoding method may be used without using this method, if the index is 1, a method of copying from a previous line may be used and if the index is 2, a method of copying from a line 2 lines away may be used. For such a method, a method may be used that when it exists at the same horizontal position as run length and an initial index to be currently encoded, it is copied by indicating a vertical position only with an index.

Figure 16:
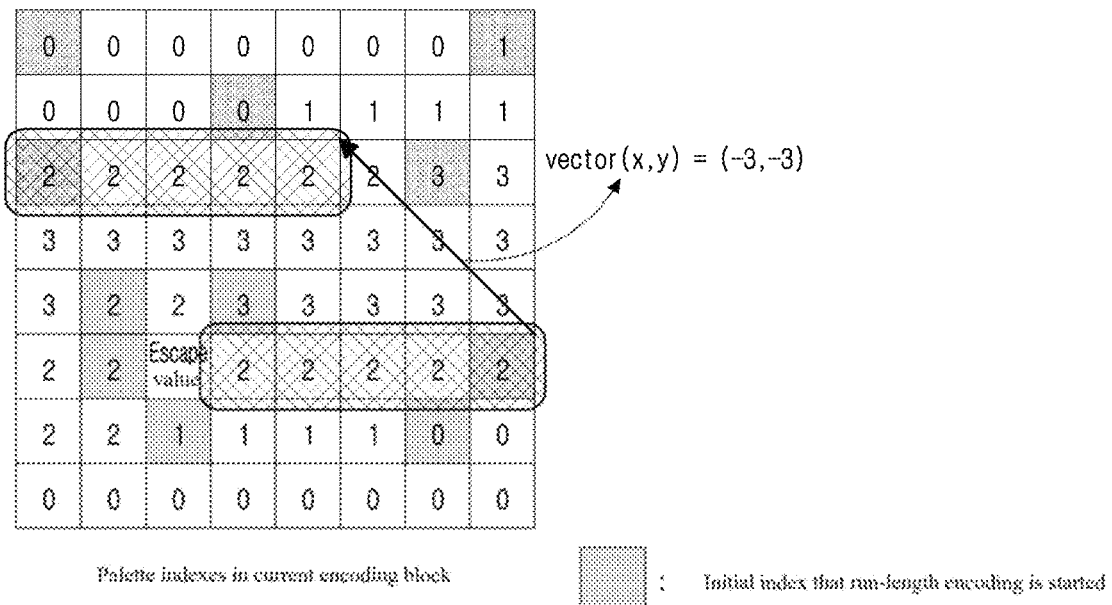

If it is not the same horizontal position, from which region it is copied may be expressed by using a vector. FIG. 16 is an example on the vector.

In this case, an encoding/decoding device may use a start point and an end point of a vector by setting the same rule. In FIG. 16, a vector was expressed as a negative number if it is in a left or upper direction based on a current start point and expressed as a positive number if it is in a right or lower direction. But, for a horizontal directional scan, a y-component vector is always a negative number in a scan order, so a sign may not be encoded for a y-component. In another example, for a vertical directional scan, a x-component vector is always a negative number in a scan order, so a sign may not be encoded for a x-component.

Alternatively, redundancy may be removed between conventional consecutive run length encoding methods. For example, indexes in a block of FIG. 15 are expressed as 0 0 0 0 0 0 1 1 1 1 1 . . . in a scan order. Such indexes may be expressed as initial index 0, run length 6, initial index 1, run length 4 . . . through run length encoding. As the number of pixels with the same value as an initial index is expressed by run length, an N-th initial index may have a value different from a previous initial index. In an example, when an initial index is 1, it means that an initial index of a previous order is not 1. With it, run length encoding may be performed by reassigning an index value for residual indexes except for a previous initial index. In an example, an index that an original value is smaller than an original value of a previous initial index maintains its value and a value subtracting 1 from an original value is reassigned to an index that an original value is greater than an original value of a previous initial index. Here, an original value represents an index value before reassignment, not a reassigned index value. In an example, if a previous initial index is 1, index 0 maintains an index value, whereas index 1 to index 3 may be assigned to index 2 to index 4 whose index is greater than 1.

When it is applied to the example, a method expressed as initial index 0, run length 6, initial index 1, run length 4 . . . in the example may be changed into initial index 0, run length 6, initial index 0, run length 4. . . .

In a decoding device, after decoding second initial index 0, an original value of an initial index may be reconstructed by increasing it as opposed to an encoding device in a process of comparison with a previous initial index. In an example, if a value of an initial index is smaller than an original value of a previous initial index, a value of an initial index may be set as an original value of an initial index as it is. On the other hand, if a value of an initial index is equal to or greater than an original value of a previous initial index, a value adding 1 to a value of an initial index may be set as an original value of an initial index.

Removing redundancy by reassigning a value of an initial index may be used in the same manner also in a method of copying from a previous line. If a previous initial index and corresponding run length are copied from a previous line when an initial index is encoded, a value at the same position as a current initial index in a previous line should be different from a current initial index. If they had been the same, run length would have been expressed by combining a current initial index with a method of copying from a previous line, which is a method that a previous initial index is encoded. Accordingly, similarly, encoding may be performed by reducing a value.

Figure 17:
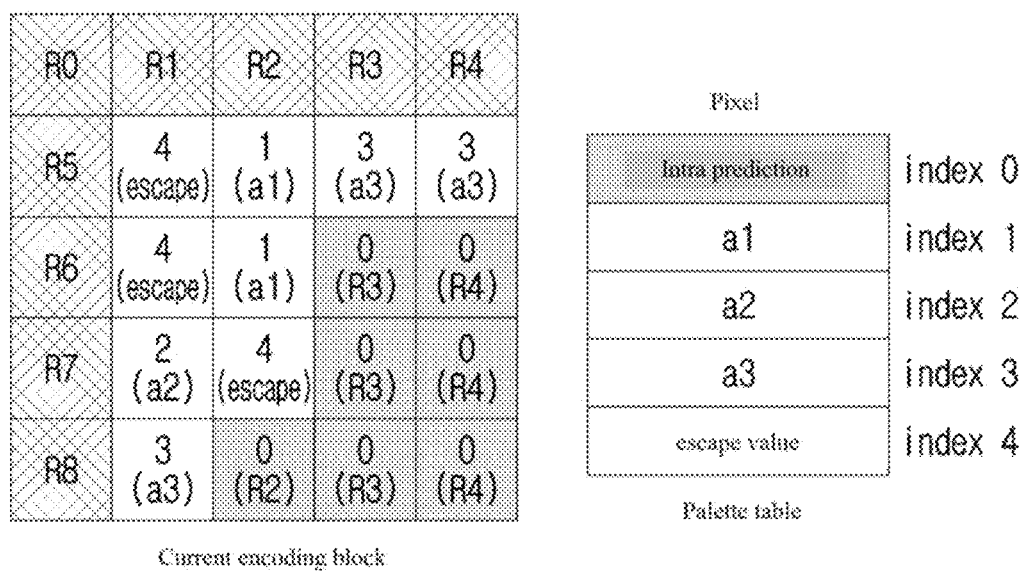

FIG. 17 is an example on a method that intra prediction and a palette mode are applied at the same time. In FIG. 17, an index and a corresponding pixel are indicated per each position.

For example, information representing that intra prediction was used is assigned to index 0 of a palette table. Subsequently, a value which performed intra prediction by using reconstructed pixels around a current block is assigned to a pixel position indicated as index 0. After encoding information representing whether a method that a conventional palette mode is used per block or a method that intra prediction is combined was used, if it is determined that a combined method was used, which intra prediction was used may be determined by using an index. According to the number of used intra prediction modes, a mode itself may be encoded as it is and may be also encoded by using a MPM (Most Probable Mode). Alternatively, an intra prediction mode may be also encoded by using a default intra mode. A default mode may include at least one of Planar, DC, Horizontal, Vertical.

Figure 18:
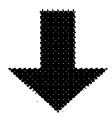

FIG. 18 is an example on a case in which a palette mode and a block searched by using a BV described in FIG. 11 are combined.

For example, information representing that it is a pixel using a BV is assigned to index 0 of a palette table. Subsequently, for a pixel position indicated as index 0, pixels at the same position in a block searched by using a BV are assigned to a position of index 0. After encoding information representing whether a method that a conventional palette mode is used per block or a combined method using a BV was used, if it is determined that a combined method was used, information related to a BV is transmitted to a decoding device. When deriving a BV, a method is possible that which BV was used among BVs in a surrounding block is designated as an index as in FIG. 10 or a method is also possible that a BV is directly encoded and transmitted to a decoding device. Alternatively, a method is also possible that after determining a priority in an order of A->B->C->D->E in FIG. 10, a BV is brought from a position where a BV is determined to exist first and is used for a current block. In this case, it is not necessary to encode information related to a BV.

An index representing intra prediction or an index representing the use of a BV may be assigned to a pre-defined position in a palette table. In an example, as illustrated in FIG. 17 and FIG. 18, the indexes may be arranged to a first of a palette table and contrary to a shown example, the indexes may be arranged to a last of a palette table. Alternatively, a value assigned to the index may be determined based on at least one of a value/an angle of an intra prediction mode, a size of a BV, a size/a shape of a block, or an intra prediction mode of a neighboring block. Alternatively, when an escape value is encoded, a method using the intra prediction or a method using a BV may be used. For example, a value may be brought from a surrounding reconstructed pixel according to a used intra prediction mode and replaced with an escape value or a value at the same position may be brought from a block searched by using a BV and replaced with an escape value. Alternatively, a method is also possible that the values are used as a prediction value instead of being replaced with an escape value and only a difference value is encoded and transmitted. This difference value may be encoded as it is or may be also encoded after performing quantization.

Syntaxes used in the above-described embodiments are just named for convenience of a description.

When embodiments described based on a decoding process or an encoding process are applied to an encoding process or a decoding process, it is included in a scope of the present disclosure. When embodiments described in a pre-determined order are changed in an order different from a description, it is also included in a scope of the present disclosure.

The above-described embodiment is described based on a series of stages or flow charts, but it does not limit a time series order of the present disclosure and if necessary, it may be performed at the same time or in a different order. In addition, each component (e.g., a unit, a module, etc.) configuring a block diagram in the above-described embodiment may be implemented as a hardware device or a software and a plurality of components may be combined and implemented as one hardware device or software. The above-described embodiment may be recorded in a computer readable recoding medium by being implemented in a form of a program instruction which may be performed by a variety of computer components. The computer readable recoding medium may include a program instruction, a data file, a data structure, etc. solely or in combination. A hardware device which is specially configured to store and perform magnetic media such as a hard disk, a floppy disk and a magnetic tape, optical recording media such as CD-ROM, DVD, magneto-optical media such as a floptical disk and a program instruction such as ROM, RAM, a flash memory, etc. is included in a computer readable recoding medium. The hardware device may be configured to operate as one or more software modules in order to perform processing according to the present disclosure and vice versa.

INDUSTRIAL APPLICABILITY

The present disclosure may be used for encoding or decoding an image.

What is claimed is:

1. A video decoding method comprising:
   determining, based on a first flag decoded from a bitstream, whether a palette mode is applied to a current block;
   configuring a palette table for the palette mode of the current block;
   determining a palette index in a unit of a pixel of the current block; and
   predicting a current pixel in the current block based on the palette table and a palette index for the current pixel,
   wherein the palette table of the current block is configured by using a palette predictor list, the palette predictor list being updated by a palette table of a block coded by the palette mode, and
   wherein in response to a CTU to which the current block belongs being a first CTU of a current CTU row, an initial palette predictor list of the CTU to which the current block belongs is configured by using a palette table of a first CTU of a previous CTU row.

2. The method of claim 1, wherein the first flag is adaptively decoded based on at least one of a prediction mode of the current block or a size of the current block.

3. The method of claim 1, wherein the palette table of the current block is configured with at least one palette entry and an index identifying each palette entry, and
   wherein the palette entry of the palette table is configured by using a second flag representing whether a palette entry belonging to the palette predictor list is reused for the palette table of the current block.

4. The method of claim 1, wherein the palette index for the current pixel in the current block is determined by using at least one of an index mode or a copy mode,
   wherein, under the index mode, palette index information for specifying the palette index for the current pixel in the current block is signaled, and wherein, under the copy mode, the palette index for the current pixel is determined based on a palette index of a neighboring pixel determined by a predetermined scan order.

5. A video encoding method comprising:
configuring a palette table for a palette mode of a current block;
determining a palette index in a unit of a pixel of the current block;
predicting a current pixel in the current block based on the palette table and a palette index for the current pixel, and
encoding a first flag indicating whether the palette mode is applied to the current block or not,
wherein the palette table of the current block is configured by using a palette predictor list. the palette predictor list being updated by a palette table of a block coded by the palette mode, and
wherein in response to a CTU to which the current block belongs being a first CTU of a current CTU row, an initial palette predictor list of the CTU to which the current block belongs is configured by using a palette table of a first CTU of a previous CTU.

6. The method of claim 5, wherein the first flag is adaptively encoded based on at least one of a prediction mode of the current block or a size of the current block.

7. The method of claim 5, wherein the palette table of the current block is configured with at least one palette entry and an index identifying each palette entry, and
wherein the palette entry of the palette table is configured by using a second flag representing whether a palette entry belonging to the palette predictor list is reused for the palette table of the current block.

8. The method of claim 5, wherein the palette index for the current pixel in the current block is determined by using at least one of an index mode or a copy mode, and
wherein, under the index mode, palette index information for specifying the palette index for the current pixel in the current block is encoded, and
wherein, under the copy mode, the palette index for the current pixel is determined based on a palette index of a neighboring pixel determined by a predetermined scan order.

9. A computer readable recoding medium storing a bitstream encoded by a video encoding method, wherein the video encoding method includes:
configuring a palette table for a palette mode of a current block;
determining a palette index in a unit of a pixel of the current block;
predicting a current pixel in the current block based on the palette table and a palette index for the current pixel, and
encoding a first flag indicating whether the palette mode is applied to the current block or not,
wherein the palette table of the current block is configured by using a palette predictor list, the palette predictor list being updated by a palette table of a block coded by the palette mode, and
wherein in response to a CTU to which the current block belongs being a first CTU of a current CTU row, an initial palette predictor list of the CTU to which the current block belongs is configured by using a palette table of a first CTU of a previous CTU.

\* \* \* \* \*

UNITED STATES PATENT AND TRADEMARK OFFICE
CERTIFICATE OF CORRECTION

Page 1 of 1

PATENT NO. : 12,069,240 B2
APPLICATION NO. : 17/636987
DATED : August 20, 2024
INVENTOR(S) : Sung Won Lim It is certified that error appears in the above-identified patent and that said Letters Patent is hereby corrected as shown below:

In the Claims

In Claim 5, Column 25, Line 23, please replace "a previous CTU." with --a previous CTU row.--;

In Claim 9, Column 26, Line 32, please replace "a previous CTU." with --a previous CTU row.--.

Signed and Sealed this
Twenty-fifth Day of March, 2025

Coke Morgan Stewart
*Acting Director of the United States Patent and Trademark Office*